Patented Mar. 24, 1931

1,798,075

UNITED STATES PATENT OFFICE

JAMES G. FANCY, OF FORT MEADE, FLORIDA

CLEANING AND POLISHING COMPOUND

No Drawing.   Application filed March 8, 1928. Serial No. 260,248.

This invention relates to a cleaning and polishing compound, and has for one of its objects to provide a compound of this character through the medium of which all foreign matter may be easily and quickly removed from the paint of an automobile and the paint provided with a lustrous protective coating.

A further object of the invention is to provide a compound of the character stated which shall also be adapted to be used for the purpose of cleaning and polishing furniture, glass, nickel, aluminum, gold, silver, hard rubber products and the like.

The compound comprises a base consisting of the reaction product of phosphate rock powder, castile soap and alcohol. The base is prepared from sixteen ounces of phosphate rock powder, four ounces of castile soap and eight ounces of ethyl alcohol, and in preparing the same the soap is first dissolved in the alcohol, the phosphate rock powder is then mixed therewith, and the mixture is then permitted to set until the chemical action fully takes place and the alcohol is evaporated.

The compound also comprises alcohol and water, and the ingredients are used in about the following proportions—viz., 2 ounces of the base, 1 quart of distilled water and 1 ounce of alcohol.

The compound is applied to the surface to be cleaned and polished through the medium of a cloth or the like. After all the foreign matter has been removed from the surface, the compound coating the surface is made lustrous by polishing it with a soft cloth. If the surface is very dirty two coatings of the compound should be applied, the first being washed off with clean cold water before the application of the second. The compound will not, due to the manner in which the base thereof is prepared, scratch or mar the surface and will permit it to be cleaned and polished in a comparatively short time and with comparatively little labor.

What is claimed is:—

1. A base for a cleaning and a polishing compound prepared from sixteen ounces of phosphate rock powder, four ounces of soap and eight ounces of alcohol.

2. A base for a cleaning and polishing compound prepared from sixteen ounces of phosphate rock powder, four ounces of castile soap, eight ounces of ethyl alcohol, the soap being first dissolved in the alcohol, the phosphate rock powder then being mixed with the dissolved soap.

In testimony whereof I affix my signature.

JAMES G. FANCY.